United States Patent Office 3,553,585
Patented Jan. 5, 1971

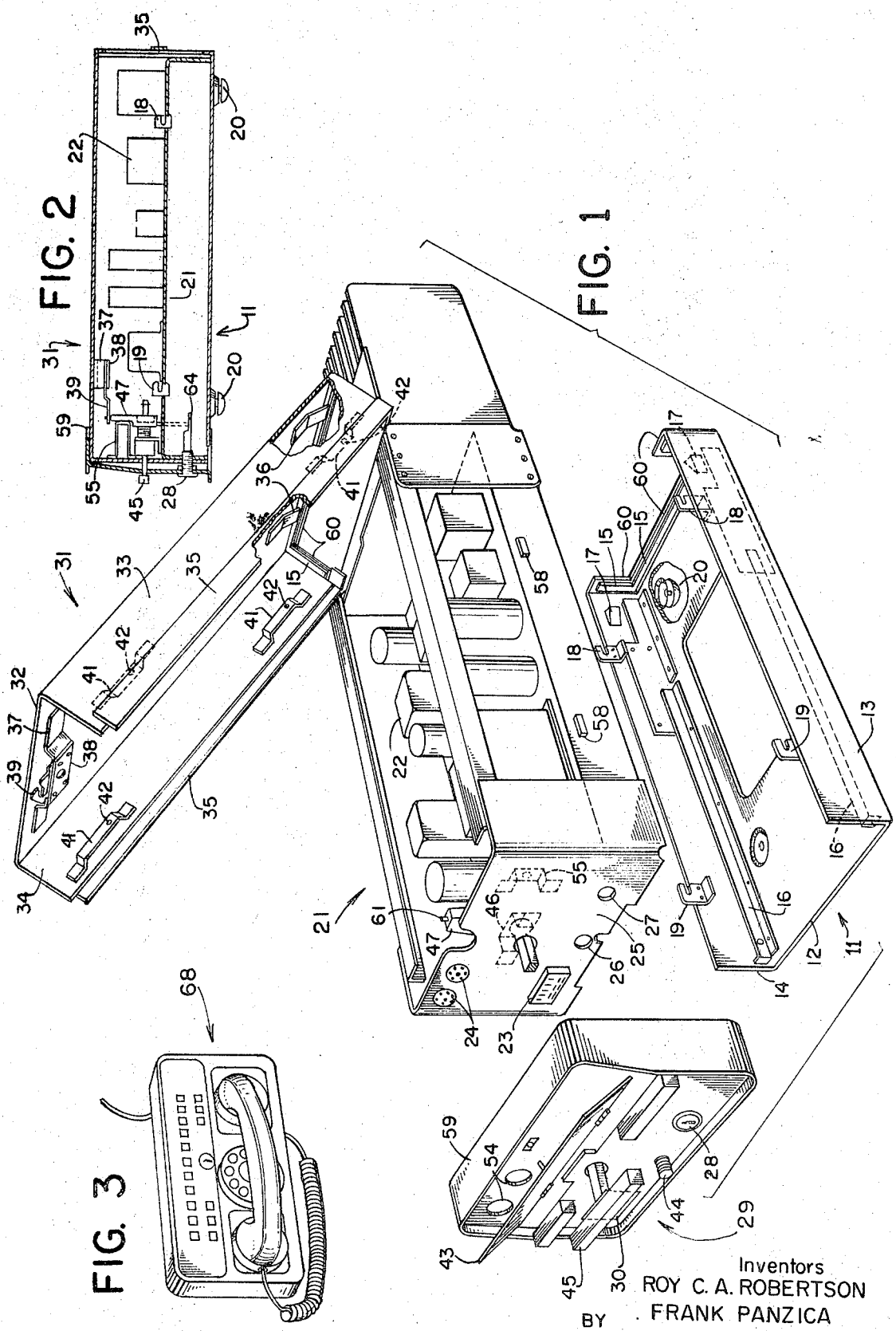

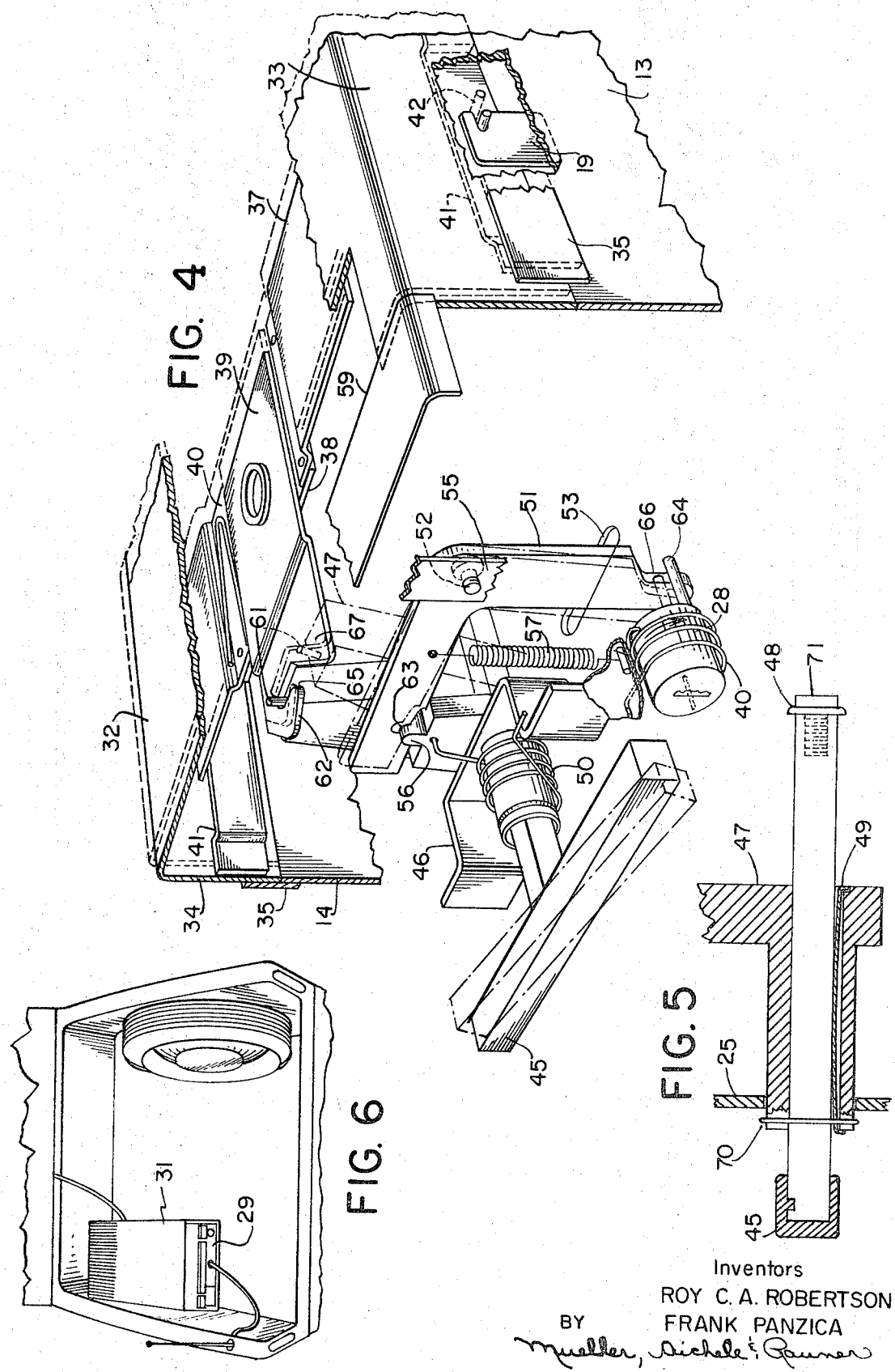

3,553,585
LOCKING AND LATCHING MECHANISM FOR MEMBERS OF COMMUNICATION EQUIPMENT CHASSIS
Roy C. A. Robertson, Forest Park, and Frank Panzica, Chicago, Ill., assignors to Motorola, Inc., Franklin Park, Ill., a corporation of Illinois
Filed Dec. 5, 1968, Ser. No. 781,451
Int. Cl. H04b 1/08
U.S. Cl. 325—15                                15 Claims

ABSTRACT OF THE DISCLOSURE

A communication unit housing, and mounting structure including a base member, a movable top member, and a front panel secured to the chassis of the unit. Parts of the housing assembly cooperate with one another and a latching mechanism to hold the parts in assembled relation. A keyed locking device cooperates with the latching mechanism which has a handle to release the latching mechanism, to aid in the disassembly of the parts, and to facilitate carrying the unit. Connectors provide interconnection with external control and signal sources and test equipment.

BACKGROUND OF THE INVENTION

There is a large demand for compact two-way communication units in applications in which the units must be installed in trains, automobiles, or other mobile vehicles. It is desirable that such units be adaptable for installation in trunks of vehicles or in special compartments adapted for their use, and yet be of such construction to facilitate test of the unit when installed and permit easy removal of the entire communication unit or of the communication unit chassis for servicing. In prior structures, such as that described in U.S. Pat. No. 2,731,555 issued to C. E. Beck, the base member was bolted to the trunk of the vehicle. A chassis containing communication equipment was seated on this base member and a top member was placed over the chassis and base member. The parts were held in assembled relation by interlocking parts on the base member, top member and front panel, with a keyed locking device on the front panel coacting with a slot in the base member. To remove the chassis for servicing, the key was inserted in the keyed locking device and turned a quarter turn. The chassis was then pulled forward a short distance to release the top and bottom members.

This structure has been used to advantage for many years but has the disadvantage that excessive force is required to slide the chassis forward because of the weight of the chassis with its communication equipment, and the frictional forces between the interlocking parts. Two hands must be used to perform this operation. To hold the keyed locking device in its unlocked position and slide the drawer forward, therefore, requires two people, which is objectionable. This also had the disadvantage that the communication unit must be mounted in a location accessible by two servicemen, which resulted in the unit being mounted in the center of an automobile trunk, or in a large accessible compartment on a train, thereby wasting valuable storage space.

SUMMARY OF THE INVENTION

It is an object of this invention to provide an improved communication unit housing which can be readily disassembled by one person allowing the communication unit chassis therein to be removed for servicing.

Another object is to provide a novel mechanism which latches, unlatches, and aids in disassembling the housing of a communication unit.

Still another object of this invention is to provide a communication unit which can be mounted in a smaller, less accessible portion of an automobile trunk or train compartment thereby eliminating the waste of valuable storage space.

In practicing the invention a communication unit is provided which is mounted in a housing including a base member, a movable top member for the base member, a front panel, and a chassis including electronic communication equipment, which may be seated on the base member. The chassis has an end portion which supports plug-in connectors electrically connected to the communication equipment and adapted to fit mating parts mounted on external control and energy supplying conductors and external test equipment. This end portion of the chassis also supports a portion of a latching mechanism which cooperates with a portion attached to the top member for latching and releasing the same to hold the base member, top member, chassis and front panel in assembled relation and to aid in disassembly of the same. The front panel is attached to the end portion of the chassis serving to cover such portion and assist in holding the base member and top member in assembled relation. Mounted to the front panel are a keyed locking device which cooperates with the latching mechanism of the chassis, and a coaxial connector electrically connected to the communication equipment. Apertures are provided on said front panel which provide access to the plug-in connectors on the chassis. A metal shaft with an attached handle is supported by the chassis locking mechanism and is slidable therein. The shaft extends through apertures in the chassis end portion and front panel. When the handle is in its extended position it may be used for carrying the unit or for operating the mechanism. Operation of the latching mechanism on the chassis by rotating the handle will release the latching mechanism in the top member and slide the top member away from the front panel thereby releasing the top member and chassis for easy removal. When the handle is not extended it fits flush with a portion of the front panel.

BRIEF DESCRIPTION OF THE DRAWINGS

FIG. 1 is a perspective view of a disassembled communication unit constructed in accordance with the invention;

FIG. 2 is a section showing the manner in which the housing is held in assembled relation and the latching mechanism;

FIG. 3 shows a control unit for the communication unit;

FIG. 4 is a perspective view of the latching mechanism, and shows sections of the housing in assembled relation;

FIG. 5 shows a section of the handle and a portion of the latching assembly; and FIG. 6 is a perspective view of the communication unit showing one type of installation.

DESCRIPTION OF THE PREFERRED EMBODIMENT

Referring to the diagrams, the communication unit has a housing including base member 11 of sheet metal construction having a bottom 12, right side 13 and left side 14 at right angles to the bottom. One end of this structure has the bottom 12 and sides 13 and 14 turned inwardly, perpendicular to themselves to form a retaining edge 60 for the chassis 21 and add rigidity to the base member. Resilient pads 15 are positioned on the inner surface of these turned-in edges. Sheet metal brackets 16 are welded to the inner surface of the bottom 12 and are positioned parallel to sides 13 and 14. Bracket 16 welded to the inner surface of the sides, serve to hold chassis 21 in a predetermined horizontal position on the base member. Resilient pads 17, attached to the inner surface of the sides, serve to prevent mechanical vibration from being transferred from base member 11 to chassis 21, and to hold chassis 21 in a predetermined horizontal position on the base member. Sheet metal brackets 18 and 19, welded to the inner surface of the sides, have a U-shaped notch which interacts with brackets 41 and rivet 42 on the top member 31 to retain said top member in assembled relation. The brackets 18 and 19 have an extra lip at their bottom edge which projects inwardly perpendicular to the side walls serving to prevent the chassis from moving in a vertical direction when positioned on the bottom member.

Mounting feet 20 are attached by screws to the base member and are used to position the unit on a surface without damaging the housing.

The top member of the housing 31 is of sheet metal construction having a top 32, right side 33 and left side 34 which are at right angles to the top and project downwardly. Welded to the outer suface of the left and right sides at the bottom edge is a downwardly extending lip 35 which overlaps the sides of the base member serving to hold the top and bottom members in a predetermined horizontal relation. One end of the top member has the top 32 and sides 33 and 34 turned inwardly perpendicular to themselves to form a retaining edge 60 for the chassis 21 and add rigidity to the top member. Resilient pads 15 are positioned on the inner surface of these turned-in edges. Sheet metal brackets 36, welded to the inner surface of the top, serve to prevent the rear end of the chassis from moving in a vertical direction. Sheet metal bracket 37, welded to the inner surface of the top, serves to mount the top latching mechanism consisting of a pivot plate 38, a latch 39 and a latch spring 40. The pivot plate is a flat metal plate which is attached by screws to bracket 37 and has a center hole havingan edge rolled over perpendicular to the flat surface. The latch 39 is sandwiched between the inside of the top and the pivot plate 38 with the edge surrounding the hole in the pivot plate inserted into a hole in the latch. The V-shaped latch spring 40 bears against an inside wall of bracket 37 and the side of latch 39 biasing said latch to its locked position. Brackets 41 are welded to the inner surface of the left side 34 and right side 33 with rivet 42 inserted between the bracket and side and attached to them.

Slidably seated in base member 11 in a drawer like fashion in a chassis 21 mounting an electronic signaling unit including a transmitter-receiver indicated at 22. Chassis 21 supports plug-in connector means shown at 23 and 24 in end portion 25.

Apertures 26 and 27 in end portion 25 accommodate a signal supply conductor going to the transmitter-receiver 22 and a keyed locking device 28 which cooperates with the chassis latching mechanism. Plug-in connector means 23 may comprise a Jones plug, or the like, and is electrically connected to the transmitter-receiver unit 22 for supplying energy thereto and making signalling connections therewith. Plug-in connector means 24 comprise standard metering sockets to allow test measurements at different points in the circuit of the transmitter-receiver unit.

Front panel 29 is secured to end portion of chassis 21 by means of a number of screws and has located thereon a rectangular aperture 30 through which connector 23 extends, a hinged door 43 closing apertures 54 for providing access to the metering sockets 24 on chassis 21, a keyed locking device 28, and a connector portion 44 for receiving the signal supply conductor and a peripheral edge 59 which surrounds the top and bottom members when in assembled relation.

A handle 45 extends through apertures in the end panel 29, the end portion 25 of chassis 21, a U-shaped bracket 46 welded to the end portion 25 of chassis 21, and an L-shaped locking link 47, which may be manufactured of compressed powdered metal or by a casting process or by other processes widely known in the industry. The horizontal portion of locking link 47 is inserted through the apertures in bracket 46 and end portion 25 of chassis 21. Retaining clip 70 mounted in a notch on the hoizontal portion of locking link 47 prevents movement of the locking link from its predetermined position. A friction spring 49 inserted in the locking link bears against the shaft of handle 45 retaining the handle in the position to which is was last moved when the assembly is sujected to shock or vibration. Washer 48 and screw 71 attached to the end of the handle shaft prevent the handle from being pulled out of the assembly. Spring 50 which surrounds the cylindrical portion of the locking link has one end inserted in a groove on the U-shaped bracket 46 and the other end inserted in the locking link biasing said locking link to its upright and locked position and the handle 45 to its horizontal and locked position. A right angle shaped lock bar 51 is pivotally attached to a U-shaped bracket 55 welded to the front panel 25 of chassis 21 by means of a shoulder screw 52. The vertical portion of locking bar 51 extends through a slot 53 in chassis 21. The horizontal portion of locking bar 51 has a notch 63 cut therein which catches a finger shaped protrusion 56 on locking link 47. Spring 57 serves to bias the lock bar to its locked position.

To assemble the communication unit, chassis 21 is placed on base member 11 with its end portion 25 positioned a short distance in front of the end portion of the base member that does not have its edge turned inwardly. The chassis is then slid onto the base member 11 such that the chassis tabs 58 slide under the right angled portion of brackets 18 and 19. The chassis bears against resilient pads 15 and the front panel edge 59 surrounds the edge of the base member 21.

Top member 31 is dropped onto base member 11 such that edge 35 of top member 31 overlaps sides 13 and 14 of base member 11 and brackets 18 and 19 on base member 11 fit between side brackets 41 and the inner surface of sides 33 and 34 of top member 31. Top member 31 is then slid forward so that the notch in brackets 18 and 19 on base member 11 engages rivets 41 on top member 31 thereby preventing the top member 31 from being lifted off the base member. An the top member is pushed forward, pin 61 on locking link 47 bears against cam surface 62 of latch 39. Notch 63 in locking bar 51 captures protrusion 56 on locking link 47 preventing the link 47 and therefore pin 61 from pivoting sideways. This therefore forces latch 39 to pivot sideways about its pivot point as the top member 31 is pushed forward. Latch 39 is biased back to its closed position by spring 40 as pin 61 passes latch cam surface 62 thereby capturing pin 61 in notch 65 of the latch. Simultaneously with the above described function, the open end portion of top member 31 slides under the front panel peripheral edge 59 and resilient pads 15 on top member 31 bear against chassis 21. The communication unit is now assembled and locked. A signal supply and control cable attached to control unit 68 is inserted into connector 23 on chassis 21, the signal supply conductor from the antenna is attached to connector 44 and the unit is ready for use.

To unlock and disassemble the unit the connecor from control unit 68 and signal supply conductor from the antenna are removed. A key is inserted in the locking device 28 and rotated in a clockwise direction. As the lock is rotated in a clockwise direction an eccentric pin 64 on the rear of locking device 28 bears against the edge 66 of locking bar 51 causing the locking bar to pivot about shoulder screw 52 raising the vertical portion of locking bar 51 and releasing protrusion 56 on locking link 47 from its captured position in notch 63 of locking bar 51. Handle 45 may now be turned clockwise causing locking link 47 to pivot in a clockwise direction releasing locking link pin 61 from its captured position in notch 65 of latch 39 and causing pin 61 to bear against cam surface 67 of latch 39 forcing the entire top member 31 to slide back on the edges of bottom member side walls 13 and 14, thereby releasing the top member from the front panel and brackets 18 and 19. Handle 45 is then reelased allowing it to be biased to its horizontal position. Keyed locking device 28, which is spring biased to the locked position by spring 71, is then allowed to return to its locked position by releasing the key. Returning keyed locking device 28 to its locked position allows locking bar 51 to again capture protrusion 56 on locking link 51 thereby locking handle 45 in place and preparing the latching mechanism for reassembly of the communication unit. Top member 31 can then be liftably removed from its seat on base member 11, the front panel and chassis can be slid forward a short distrance and then either slidably or liftably removed from base member 11.

As can be seen from the above description it is now possible for one serviceman to simply disassemble the unit by extending the handle, inserting the key into the keyed locking device, and turning the handle. This unlocks the latching mechanism and pushes the top member away from the front panel, allowing the communication unit to be slidably and liftably removed. Providing this novel mechanism which allows the unit to be disassembled by one serviceman, allows placement of the unit in a smaller less accessible portion of an automobile trunk or train compartment thereby eliminating the waste of valuable storage space.

What is claimed is:

1. A communication unit housing including in combination, a base member, a movable top member adapted to be positioned on and co-act with said base member, a chassis containing communication equipment supported on said base member in a drawer like fashion, a front panel secured to said chassis and having a peripheral edge surrounding associated ends of said base member and said movable top member for retaining said top member in assembled relation on said base member, latching means having portions secured to said top member and to said chassis for holding said chassis, front panel and top member in assembled relation on said base member, said latching means including a handle extending through said front panel and operative to release said latching means and to cause said movable top member to slide away from said front panel to a position such that said top member can be liftably removed to provide access to said chassis and permit removal thereof from said base member.

2. The communication unit housing of claim 1 including interlocking portions on said top member and said base member which are engaged and released as said top member is slid on said base member, said interlocking portions preventing said top member from being liftably removed from said base member when said unit is in assembled relation.

3. The communication unit housing of claim 1 including keyed locking means mounted on said front panel and cooperating with said latching means.

4. The communication unit housing of claim 1 wherein said base member includes a bottom and side walls, and means secured to said base member to hold said chassis in a predetermined horizontal and vertical position on said base member.

5. The communication unit housing of claim 1 wherein said top member includes a top and side walls, means on said side walls to properly position said top member on said bottom member, and means on said top member to hold said chassis in a predetermined horizontal and vertical position within said housing.

6. The communication unit housing of claim 1 wherein said base member includes a bottom and side walls, first bracket means secured to said bottom and having guide portions extending parallel to said side walls, holding the chassis in a desired horizontal position, resilient means secured to said side walls, holding the chassis in a desired horizontal position, and preventing mechanical vibrations from being transferred to said chassis from said base member, third bracket means secured to said side walls and having portions preventing the chassis from moving in a vertical direction, said third bracket means having portions with notches therein, rod means secured to said top member and cooperating with said notches for preventing said top member from being liftably removed from said base member when said unit is in assembled relation, said base member having a first end portion with inwardly turned edges perpendicular to said bottom and side walls with resilient pads mounted thereon bearing against said chassis, said end portion and said resilient pads preventing said chassis from sliding out of said first end portion, said base member having a second end portion slidably seated within the front panel when said communication unit is in assembled relation.

7. The communication unit housing of claim 1 wherein said top member includes a top and side walls, first bracket means secured to said side walls and extending downward forming a lip thereon positioning said top member in a predetermined position on said base member, second bracket means secured to the inner surface of said top for holding the chassis in a proper vertical relation, third bracket means secured to the inner surface of the sides, rod means extending between said third bracket means and said sides, fourth bracket means on said bottom member adapted to engage said rod means to prevent said top member from being liftably removed from said bottom member when in assembled relation, said top member having a first end portion with inwardly turned edges perpendicular to said top and side walls, resilient pads mounted on said edges preventing the chassis from sliding out of said first end portion, and a second open end portion slidably seated within said front panel when said communication unit is in assembled relation, fourth bracket means secured to the inside surface of said top, said fourth bracket means having assembled thereon a latching mechanism.

8. The communication unit housing of claim 7 wherein said latching mechanism on said top cooperates with latching mechanism mounted on said chassis, and is operated by said handle to lock said communication unit, hold said communication unit in assembled relation, unlock said communication unit, and cause the movable top member to slide away from the front panel to a position such that said top member can be liftably removed to provide access to said chassis and permit removal thereof from said base member.

9. The communication unit housing of claim 7 wherein said latching mechanism on said top includes in combination a pivot plate, a latch, and a latching spring, said pivot plate being attached by screws to said fourth bracket means with a center pivotal hole having turned-in edges, said latch being mounted on said pivot and between said pivot plate and said inside surface of said top, said latching spring being mounted between said inner surface of said top and said pivot plate with one portion of said spring bearing against an edge of said latch and a second spring surface bearing against a surface of said fourth bracket means.

10. The communication unit housing of claim 9 wherein said latch of said latching mechanism has a first cam surface, a notch, and a second cam surface, said first cam surface causing said latch to pivot to a second position when the latching mechanism on said chassis bears against said first cam surface, said spring biasing said latch to a first position when said latching mechanism on said chassis passes said first cam surface, said notch in said latch capturing a portion of said latching mechanism on said chassis, thereby locking said communication unit and holding said communication unit in assembled relation, said second cam surface causing said top member to slide backwards on said base member side wall edges when said latching mechanism on said chassis bears against said second cam surface thereby unlocking said communication unit and causing the movable top member to slide away from the front panel to a position such that said top member can be liftably removed to provide access to said chassis and permit removal thereof from said base member.

11. The communication unit housing of claim 1 wherein said chassis includes a transmitter-receiver communication unit mounted thereon, said chassis including an end portion having apertures therein for accommodating a signal supply conductor, test sockets electrically connected to various points in the circuit of said transmitter-receiver to render the same readily accessible for meter reading, and plug-in connector means electrically connected to said transmitter-receiver unit and adapted to fit mating parts on external means cooperating with said transmitter-receiver unit to render the same operative, a chassis latching mechanism assembled thereon with handle extending therein, said handle extending through said chassis end portion and through said front panel, said handle, chassis latching mechanism, and top latching mechanism cooperating to lock said communication unit in assembled relation, unlock said communication unit and cause the movable top member to slide away from the front panel to a position such that said top member can be liftably removed to provide access to said chassis and permit removal thereof from said base member.

12. The communication unit housing of claim 11 wherein said latching mechanism on said chassis includes in combination, a locking link pivotally assembled on first bracket means secured to the end portion of said chassis, a locking link spring surrounding a portion of said locking link, said locking link spring biasing said locking link to an upright and locked position, a friction spring inserted into an aperture in a portion of the locking link, said friction spring bearing against the handle shaft which is slidably inserted through the aperture in said locking link, said friction spring serving to retain said handle in the position to which it was last moved, a retaining clip mounted in a notch at the end of the handle shaft preventing said handle from being pulled out of said assembly, a locking bar pivotally assembled to a second bracket means secured to said end portion of said chassis, said locking bar having a first position wherein said locking link is captured by said locking bar preventing said locking link from turning and disassembling said communication unit, said locking bar having a second position wherein said locking link is free allowing said handle to turn thereby allowing disassembly of said communication unit, and a locking bar spring biasing said locking bar to its locked position.

13. The communication unit housing of claim 12 wherein said locking bar of said chassis latching mechanism has horizontal and vertical portions and is pivotally assembled to said second bracket means at the junction of said horizontal and vertical portions of said locking bar, said horizontal portion of said locking bar having a notch therein, said notch engaging a finger shaped protrusion on the locking link when said bar is in said first position preventing said locking link from being turned by said handle, said horizontal portion having a hole cut therein, said locking bar spring being secured between said chassis and said locking bar hole and biasing said locking bar to said first position, said vertical portion of said locking bar having a first cam surface, a portion of a keyed locking device mounted in the front panel bearing on said first cam surface when said keyed locking device is turned causing said locking bar to pivot to said second position thereby allowing said locking link to be turned by said handle.

14. The communication unit housing of claim 12 wherein said locking link of said chassis latching mechanism has a vertical portion and a horizontal portion of cylindrical shape with an aperture therein, said cylindrical portion being mounted on said first bracket means on said chassis end portion, said locking link spring surrounding said cylindrical portion, said friction spring being inserted in said aperture and said handle shaft extending through said aperture in said cylindrical portion, said vertical portion having a finger shaped protrusion on a first surface and a metal pin mounted on a second top surface, said finger shaped protrusion being captured by said locking bar when said locking bar is in said first position preventing said handle from turning said locking link, said pin on said top surface engaging said latching mechanism in said top member thereby holding said top member, said base member, said chassis, and said front panel in assembled relation when said unit is locked, when said locking bar is in said second position and said handle is turned, said pin bearing against said second cam surface on said latch in said top member latching mechanism thereby causing said top member to slide away from said front panel along the top edge of the side walls of the bottom member disengaging said top member from said front panel and from said base member and allowing said top member to be liftably removed and said chassis and said front panel to be slidably and liftably removed from said base member.

15. The communication unit housing of claim 1 wherein said front panel includes a keyed locking device which has an eccentric pin mounted on the rear portion thereof, said eccentric pin engaging a first surface of the vertical portion of said locking bar on said chassis latching mechanism when said keyed locking device is actuated thereby causing said locking bar to pivot to said second position allowing said locking link to be turned, apertures formed in said end panel for making said plug-in connector portions and test sockets mounted on said chassis accessible when said housing is assembled, a movable door cooperating with aid test sockets to close the same when not in use, a coaxial connector for connection to said signal supply conductor, a peripheral edge on said end panel in overlapping engagement with said movable top member and base member for holding said movable top member, base member, chassis and front panel in assembled relation, and an aperture therein through which said handle is inserted.

References Cited
UNITED STATES PATENTS

| | | | |
|---|---|---|---|
| 3,101,225 | 8/1963 | Penningroth | 312—7X |
| 3,348,148 | 10/1967 | Parsons et al. | 325—15 |

ROBERT L. GRIFFIN, Primary Examiner

B. V. SAFOUREK, Assistant Examiner

U.S. Cl. X.R.

312—7; 325—353, 355, 356